No. 792,515.                                              Patented June 13, 1905.

UNITED STATES PATENT OFFICE.

JACOB GROSSMANN, OF MANCHESTER, ENGLAND.

PROCESS OF MAKING NITRITES.

SPECIFICATION forming part of Letters Patent No. 792,515, dated June 13, 1905.

Application filed March 15, 1904. Serial No. 198,300.

*To all whom it may concern:*

Be it known that I, JACOB GROSSMANN, a subject of the King of England, residing at Manchester, in the county of Lancaster, England, have invented a new and useful Improvement in the Manufacture of Nitrites, of which the following is a full specification.

It is known that when nitrate of soda is fused with carbon in the presence of caustic alkali nitrite of soda is produced more or less according to the equation:

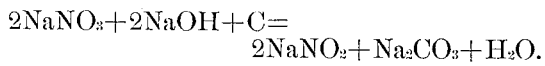

As caustic soda has to be used in excess, the resulting melt contains four salts which are easily soluble and which on lixiviation go into solution—viz., sodium nitrite, nitrate, carbonate, and hydrate—besides silicates and other impurities. This interferes seriously with the subsequent separation and purification of the nitrite. In order to overcome this objection, I use the oxid or hydrate of an alkaline earth instead of caustic alkali. The reaction which takes place may be represented by the following equation:

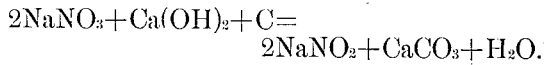

It will be seen that the only possible substances which on dissolving the melt can go into solution are the nitrite formed and whatever nitrate has not been decomposed, and as the resulting liquor may be boiled down to dryness and melted again with more caustic earth and carbon the ultimate products obtained in solution will be nitrite of soda and a small percentage of undecomposed niter free from other soluble compounds. Instead of the oxid or hydrate of calcium the oxid or hydrate of barium, strontium, or magnesium may be used. A small proportion of caustic alkali may be mixed with the lime or added to the melt to act as a carrier. The yield of nitrite and the loss in niter by overreduction and similar causes depends on the allotropic form of carbon used. The yield is highest and the loss in niter least in the case of graphite, natural or refined or artificial. Coke comes next and other forms of carbon after that.

As an example, I may describe how this process may be worked in the case where lime and graphite are used. A quantity of niter by itself or mixed with lime is melted in an iron pot provided with a mechanical stirrer and a mixture of graphite and slaked lime (to which may be added a little caustic soda) added gradually until the mass assumes a yellow color and shows by test that no more decomposition to nitrite takes place. The mass after cooling is lixiviated and the liquor separated from the insoluble residue. The liquor is boiled down to dryness in an open or in a vacuum pan and the dry mass transferred to the melting-pot and fused and treated again with a further quantity of lime and graphite. The melt resulting from this may be again lixiviated, boiled down, and melted with lime and graphite. From the resulting solution, which contains practically only nitrite and a small quantity of nitrate, commercially-pure nitrite can be easily prepared in a manner well known to chemists. The reaction does not take place exactly in the proportions shown in the equation. More lime and carbon have to be used than would correspond to the quantity of nitrite produced. This process may be reversed in this way that the nitrates of the alkaline earths may be fused with caustic alkali and carbon. Inert substances, such as chlorid of sodium, may be added as diluents. Nitrate of potash may be used instead of nitrate of soda.

Having now particularly described and ascertained the nature of my said invention and in what manner the same is to be performed, I declare that what I claim is—

1. In a process for the manufacture of alkaline nitrites by reducing nitrates with carbon the fusing of the nitrates with graphite in the presence of an oxid of an alkaline earth, substantially as described.

2. In a process for the manufacture of alkaline nitrites by reducing nitrates with carbon the fusing of the nitrates with graphite in the presence of a hydrate of an alkaline earth, substantially as described.

3. In a process for the manufacture of alkaline nitrites by reducing nitrates with carbon the fusing of the nitrates with graphite in the presence of an oxid and a hydrate of an alkaline earth, substantially as described.

In witness whereof I have hereunto set my hand in presence of two witnesses.

JACOB GROSSMANN.

Witnesses:
   SAM HAMNETT,
   ELIAS SHAWCROFT THOMAS.